(12) United States Patent
Lang et al.

(10) Patent No.: US 7,669,579 B2
(45) Date of Patent: Mar. 2, 2010

(54) METHOD FOR THE LAMBDA AND TORQUE CONTROL OF AN INTERNAL COMBUSTION ENGINE AND PROGRAM ALGORITHM

(75) Inventors: Thomas Lang, Wolfsburg (DE); Joerg Larink, Haren/Ems (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/800,331

(22) Filed: May 4, 2007

(65) Prior Publication Data

US 2007/0266700 A1  Nov. 22, 2007

(30) Foreign Application Priority Data

May 4, 2006  (DE) .................... 10 2006 020 675

(51) Int. Cl.
F02B 3/00 (2006.01)
F02B 3/10 (2006.01)

(52) U.S. Cl. ...................... 123/299; 123/300

(58) Field of Classification Search ................ 123/299, 123/300, 305, 295, 430, 672, 676, 703; 701/109; 60/276
See application file for complete search history.

(56) References Cited

U.S. PATENT DOCUMENTS 7,252,069 B2 * 8/2007 Date et al. ................. 123/299

| | | | |
|---|---|---|---|
| 2002/0053336 A1 * | 5/2002 | Nogi et al. | 123/299 |
| 2005/0022514 A1 * | 2/2005 | Kitahara | 60/285 |
| 2005/0039440 A1 * | 2/2005 | Kitahara | 60/274 |
| 2006/0016419 A1 * | 1/2006 | Kono et al. | 123/298 |
| 2006/0016425 A1 * | 1/2006 | Kono et al. | 123/305 |
| 2006/0065235 A1 * | 3/2006 | Tomita et al. | 123/305 |
| 2006/0112926 A1 * | 6/2006 | Date et al. | 123/299 |
| 2006/0266326 A1 * | 11/2006 | Yasunaga et al. | 123/299 |
| 2007/0023006 A1 * | 2/2007 | Takeda et al. | 123/305 |

FOREIGN PATENT DOCUMENTS

| | | |
|---|---|---|
| DE | 198 03 807 | 8/1999 |
| DE | 102 52 988 | 6/2004 |
| DE | 102 53 932 | 6/2004 |
| DE | 200 23 426 U | 6/2004 |
| WO | WO 2005/001266 | 1/2005 |

* cited by examiner

Primary Examiner—Mahmoud Gimie
(74) Attorney, Agent, or Firm—Kenyon & Kenyon LLP

(57) ABSTRACT

In a method for controlling the air ratio lambda and for controlling the torque of an internal combustion engine, e.g. of a diesel engine, a fuel is supplied in at least two injection processes, including a main injection of a main injection quantity and a post-injection of a post-injection quantity, and the main injection quantity is influenced to control the torque and the post-injection quantity is influenced to control the lambda value. A corrective main injection quantity ascertained for the torque control is at least proportionally subtracted from the post-injection quantity.

15 Claims, 1 Drawing Sheet

METHOD FOR THE LAMBDA AND TORQUE CONTROL OF AN INTERNAL COMBUSTION ENGINE AND PROGRAM ALGORITHM

CROSS-REFERENCE TO RELATED APPLICATIONS

The present application claims priority to Application No. 10 2006 020 675.4, filed in the Federal Republic of Germany on May 4, 2006, which is expressly incorporated herein in its entirety by reference thereto.

FIELD OF THE INVENTION

The present invention relates to a method for controlling the air ratio lambda and for controlling the torque of an internal combustion engine, e.g., of a diesel engine, and a program algorithm for implementing the method.

BACKGROUND INFORMATION

The torque of internal combustion engines, in particular of diesel engines, is usually controlled in that a torque desired by the driver is ascertained, for example, via the actuation angle of a pedal travel sensor (accelerator pedal). A fuel mass to be supplied is ascertained as a function of the pedal value or the desired torque. For this purpose, normally a precontrol is first implemented by the use of stored characteristics maps. A subsequent control is implemented, for example, by measuring the inner cylinder pressure and by correcting the fuel quantity accordingly.

Since in normal operation, diesel engines are always operated at a very high amount of excess air, that is, at lambda>>1, normally no precise lambda control is required. In diesel engines, setting a lower lambda value (at $\lambda \approx 1$ or $\lambda < 1$) and an appropriate control are only necessary in certain situations. Such situations exist, for example, when an $NO_x$ adsorption catalyst of the exhaust system is to be desulfurized or a particulate filter is to be regenerated. In order to produce a stoichiometric or hypostoichiometric air ratio required for these processes, it is convention for a method to supply the fuel by at least two injection processes such that, in addition to the main injection (or further injections), a post-injection takes place, which is implemented at a time at which the combustion occurs at low efficiency and thus in a manner only partly effective in terms of torque. The post-injection quantity supplied during the post-injection event, by contrast, combusts at only a low or even no torque-effectiveness, but produces the desired low air ratio by consuming the remaining oxygen in the combustion chamber. Overall, a main injection thus occurs, in which the supplied main injection quantity combusts in a torque-effective manner with excess air, and a post-injection, in which the supplied post-injection quantity combusts with only a limited torque-effectiveness while consuming oxygen and thus lowering the lambda value. The lambda feedback control occurs by measuring the oxygen content of the exhaust gas, for example, by using a lambda probe and by influencing the post-injection quantity accordingly. The lambda control is usually also first precontrolled.

The disadvantage of the conventional procedure is that the two controls affect each other disadvantageously. If the main injection quantity is influenced as a controlled variable for the torque control, then this has a certain effect on the resulting lambda value. On the other hand, influencing the post-injection quantity as a control mechanism for the lambda control has an—albeit small—effect on the resulting torque.

SUMMARY

Example embodiments of the present invention provide a method for the lambda and torque control, e.g., in the case of a diesel engine, in which the disadvantageous coupling of the two control loops is minimized as much as possible. In particular, the method is to allow for an exact lambda control, for example, during a regeneration or desulfurization of an $NO_x$ adsorption catalyst or a regeneration of a particulate filter, that is, at stoichiometric or rich air ratios where $\lambda \leq 1$ or lambda values are around 1, without a significant effect being noticeable on the torque behavior of the vehicle.

According to the method of an example embodiment of the present invention, the fuel is supplied in at least two injections in the above-described manner, the main injection quantity being influenced for controlling the torque and the post-injection quantity being influenced for controlling the lambda value. In other words, the main injection quantity is used as controlled variable for the torque control loop and the post-injection quantity for the lambda control loop. Thus, a corrective main injection quantity ascertained for the torque control is subtracted at least proportionally from the post-injection quantity. This change of the post-injection quantity in the opposite direction achieves the effect that the undesired influence on the air ratio lambda, which is caused by the corrected main injection quantity, is compensated as much as possible. On the other hand, this change of the post-injection quantity has practically no effect on the resulting torque since at the end of the post-injection there is practically no more oxygen available for a torque-effective combustion. Thus, an extension or shortening of the post-injection duration in accordance with the corrective main injection quantity to be compensated does not disadvantageously affect the torque behavior of the internal combustion engine. Overall, a very simple physical decoupling of the two controls is implemented. Since, the efficiency of the main injection, moreover, is much greater than that of the post-injection, the torque and the lambda value may be adjusted simultaneously and very quickly.

Since the corrective main injection quantity for the torque control may have a positive as well as a negative sign, the subtraction of the corrective main injection quantity from the post-injection quantity may accordingly result in a reduction or an increase of the post-injection quantity or post-injection duration.

It should be understood that torque control not only refers to a direct control of an effective torque provided by the crankshaft. Rather, torque control also includes methods in which the engine torque is controlled indirectly. For example, in the usual method, a cylinder pressure (pmi) is measured as an actual value using a pressure sensor and is converted into an internal torque as the actual controlled variable for a setpoint-actual comparison. The torque may also be derived from the measured rotational speed. Torque control also includes these or other methods. Furthermore, a main injection quantity (as opposed to post-injection quantity) should be understood in a broad sense as any torque-effective fuel quantity which prior to the ignition point is injected or supplied to the engine in another manner. Particularly in diesel engines, the main injection quantity is frequently divided into several injection processes and is supplied, for example, as a pre-injection and as a main injection in the narrow sense. For this purpose, within the present framework each of these injection quantities may be influenced for controlling the torque.

A portion of the corrective main injection quantity subtracted from the post-injection quantity may be metered such that an influence of the corrective main injection quantity supplied in the main injection on the lambda value and/or on the torque is at least largely compensated. The ascertainment of the portion required for this purpose may include the lambda-effectiveness of the corrective main injection quantity during the post-injection. Since at the end of the post-injection there is practically no oxygen available in the combustion chamber for the combustion, it may be roughly assumed that a reduction or increase of the fuel quantity at the end of the post-injection time has a quantitative effect in shifting the lambda value toward lean air ratios. So that the reduction of the post-injection by the corrective main injection quantity does not in turn result in an unintended reduction of the torque, the injection point of the post-injection, e.g., of the subtracted corrective main injection quantity, is set to an injection point at which there is practically no torque-effect.

According to example embodiments of the present invention, a program algorithm, that is, a computer program executes the steps of the method. The program algorithm may be stored in an engine control unit, but it may also be stored in a separate control unit.

According to an example embodiment of the present invention, a method for controlling an air ratio lambda value and for controlling a torque of an internal combustion engine includes: supplying a fuel in at least two injection processes, including a main injection of a main injection quantity and a post-injection of a post-injection quantity; influencing the main injection quantity to control the torque; influencing the post-injection quantity to control the lambda value; ascertaining a corrective main injection quantity for the torque control; and at least proportionally subtracting the corrective main injection quantity from the post-injection quantity.

The internal combustion engine may be arranged as a diesel engine.

The method may include metering a portion of the corrective main injection quantity to compensate at least largely for an influence of the corrective main injection quantity applied in the main injection on at least one of (a) the lambda value and (b) the torque.

The main injection quantity may include a precontrolled base main injection quantity and the corrective main injection quantity.

The base main injection quantity may be ascertained from a characteristics map as a function of a setpoint torque.

The corrective main injection quantity may be determined as a function of a deviation between at least one of (a) an ascertained and (b) a measured actual torque and a setpoint torque.

The post-injection quantity may include a precontrolled base post-injection quantity and a corrective post-injection quantity minus the corrective main injection quantity.

The method may include reading out the base post-injection quantity from a characteristics map as a function of at least one of (a) a desired exhaust gas temperature, (b) a desired catalyst temperature and (c) a setpoint lambda value of the exhaust gas.

The corrective post-injection quantity may be determined as a function of a deviation between at least one of (a) an ascertained and (b) a measured actual lambda value and a setpoint lambda value.

The main injection may be performed during at least one of (a) a compression stroke and (b) a power stroke.

The main injection may be performed during at least one of (a) a compression stroke and (b) a power stroke and in a range of from approximately 15° to 5° before top dead center to 5 to 15° after top dead center.

The post-injection may be performed during a power stroke.

The post-injection may be performed during a power stroke in a range from 20 to 40° after top dead center.

According to an example embodiment of the present invention, a computer-readable medium has stored thereon instructions adapted to be executed by a processor, the instructions which, when executed, cause the processor to perform a method for controlling an air ratio lambda value and for controlling a torque of an internal combustion engine, which includes: supplying a fuel in at least two injection processes, including a main injection of a main injection quantity and a post-injection of a post-injection quantity; influencing the main injection quantity to control the torque; influencing the post-injection quantity to control the lambda value; ascertaining a corrective main injection quantity for the torque control; and at least proportionally subtracting the corrective main injection quantity from the post-injection quantity.

According to an example embodiment of the present invention, a method for controlling an air ratio lambda value and for controlling a torque of an internal combustion engine, in which a fuel is supplied in at least two injection processes, including a main injection of a main injection quantity and a post-injection of a post-injection quantity, and in which the main injection quantity is influenced to control the torque and the post-injection quantity is influenced to control the lambda value, includes: ascertaining a corrective main injection quantity for the torque control; and at least proportionally subtracting the corrective main injection quantity from the post-injection quantity.

Example embodiments of the present invention are explained in more detail below with reference to the appended Figures

DETAILED DESCRIPTION

Figure 1:
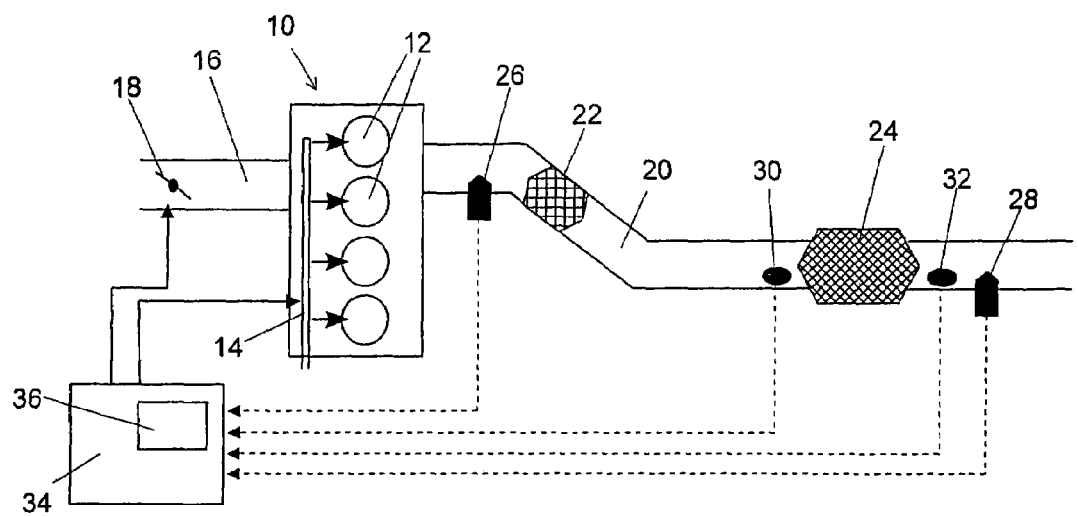
FIG. 1 is a schematic view of an internal combustion engine having a downstream exhaust system and the program algorithm according to an example embodiment of the present invention.

FIG. 1 shows in a schematic representation an internal combustion engine 10, which is, e.g., a diesel engine having, for example, four cylinders 12, and whose torque and air ratio lambda is controllable by the method hereof.

Cylinders 12 are supplied with fuel via a, e.g., directly injecting fuel supply device 14. The air supply to cylinders 12 occurs via an intake pipe 16, in which an adjustable throttle valve 18 is situated.

An exhaust gas coming from internal combustion engine 10 is conducted into an exhaust duct 20, in which a catalytic converter system 22, 24 is situated for converting environmentally relevant exhaust gas components. This includes a primary catalytic converter 22, which in diesel engines is typically an oxidation catalytic converter, and a downstream main catalytic converter 24, which in the present example embodiment is an $NO_x$ adsorption catalyst for adsorbing and converting nitrogen oxides $NO_x$. At lean air ratios (that is, when there is excess air, $\lambda > 1$), the $NO_x$ adsorption catalyst adsorbs $NO_x$ and is regenerated by the supply of a stoichiometric or rich exhaust gas ($\lambda \leqq 1$) or an exhaust gas of around 1. At larger intervals, $NO_x$ adsorption catalyst 24 must be additionally desulfurized, for which purpose a low lambda value and high exhaust gas temperatures are also required. Various sensors are also situated in exhaust duct 20. A lambda probe 26 situated near the engine, upstream from primary catalytic converter 22, measures the oxygen content of the exhaust gas, from which the air ratio lambda is determined. Furthermore, an $NO_x$ sensor 28 may be connected downstream from $NO_x$ adsorption catalyst 24, which measures the $NO_x$ content of the exhaust gas and is used to control the $NO_x$ regeneration and desulfurization cycles of $NO_x$ adsorption catalyst 24. Temperature sensors 30, 32 may be present in exhaust duct 20, e.g., upstream and downstream from $NO_x$ adsorption catalyst 24, to ascertain its catalyst temperature. Alternatively, the exhaust gas and catalyst temperature may also be calculated on the basis of current operating parameters of internal combustion engine 10 or be ascertained from characteristics maps.

The signals provided by gas and temperature sensors 26, 28, 30, 32 are read in by an engine control unit 34, which digitizes and processes these data. Additional current operating parameters of internal combustion engine 10 and of the vehicle, e.g., an engine speed measured by a speed sensor, an inner cylinder pressure pmi measured by a pressure sensor and a pedal value determined by the driver by actuating an accelerator pedal enter into engine control unit 34. As a function of the data input, engine control unit 34 controls internal combustion engine 10 in accordance with stored programs and characteristics maps. In particular, engine control unit 34 controls torque M and air ratio lambda λ of internal combustion engine 10 as controlled variables, to which end a program algorithm 36 is provided. This occurs by triggering fuel supply device 14, in the process of which defined injection times (or injection angles) and injection periods (or injection quantities) are set, and by triggering throttle valve 18 in order to meter the amount of air inducted.

The method may be used, e.g., in operating situations in which an exhaust gas lambda value must be set near the stoichiometric air ratio (λ≈1) or hypostoichiometric (λ<1). Air ratio lambda λ is defined in accordance with equation 1 as the ratio of the inducted fresh air mass m_L and the (total) supplied fuel mass q multiplied by the stoichiometric air requirement of approximately 14.5.

$$\lambda = \frac{m\_L}{14.5 \cdot q} \quad (1)$$

A stoichiometric to hypostoichiometric lambda value of the exhaust gas is required, for example, when $NO_x$ adsorption catalyst 24 is to be regenerated or desulfurized or when a particulate filter is to be regenerated. If a lambda value ≦1 is desired, then in addition to a main injection, in which a main injection quantity q_H is injected, a post-injection of a post-injection quantity q_N is performed as well such that the lambda value behaves in accordance with equation 2. Additional injection operations may be performed as well, e.g., a pre-injection in the intake stroke. These, however, change nothing in the principle of the procedure $$\lambda = \frac{m\_L}{14.5 \cdot (q\_H + q\_N)} \quad (2)$$

Figure 2:
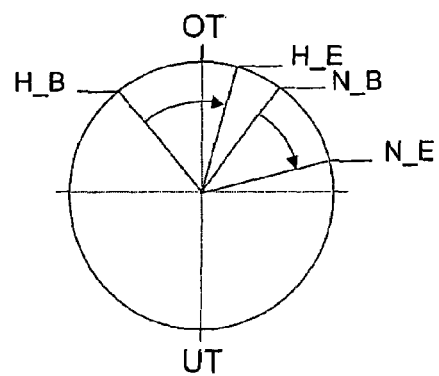
FIG. 2 illustrates injection points of the main injection and the post-injection as a function of the crankshaft angle.

The injection points of the main injection and the post-injection as a function of the crankshaft angle are shown in FIG. 2, only two strokes of the four-stroke engine, namely, the compression stroke and the power stroke, being shown. In this instance, OT indicates the top dead center (ignition dead center) and UT the bottom dead center. The main injection occurs at a relatively early time, at which there is a relatively high efficiency and thus a high torque-effectiveness. In diesel engines, this is typically the case at injection angles around OT. For example, the start of injection H_B of the main injection is triggered at 15 to 5° before OT and the end of injection H_E of the main injection is triggered at 5 to 15° after OT. At this time, the main injection quantity combusts practically completely at a high efficiency by only partially consuming the oxygen present in the combustion chamber, that is, at the end of injection H_E of the main injection there still exists a lean air ratio at λ>1. The post-injection, by contrast, occurs at a time when only a small or even no torque-effect is caused, but, on the other hand, the remaining oxygen of the combustion chamber is consumed in order to produce the desired rich or stoichiometric exhaust gas lambda value. For example, start of injection N_B of the post-injection is at 15 to 25° after OT and end of injection N_E is at 25 to 40° after OT. Beginning at a crankshaft angle of approximately 30° after OT, the combustion is substantially torque-neutral.

Main injection quantity q_H is influenced to control torque M, and post-injection quantity q_N is influenced to control air ratio lambda. In other words, main injection quantity q_H is used as the controlled variable for the torque control, and post-injection quantity q_N is used as the controlled variable for the lambda control. Since the relevant component parts in the engine are tolerance-encumbered, the two variables are first precontrolled. For this purpose, for example, the torque desired by the driver (setpoint torque) is ascertained on the basis of the pedal value, and a base main injection quantity q_Hb is read out from corresponding characteristics maps. The actual torque produced in this manner is ascertained, for example, via the inner cylinder pressure (indicated torque) or via a measured engine speed and is then compared to the setpoint torque. For adapting the actual torque to the setpoint torque, a corrective main injection quantity Δq_H is ascertained, which may be positive or negative (Δq_H>1 if M_actual <M_setpoint and Δq_H<1 if M_actual >M_setpoint), and is added to base main injection quantity q_Hb such that main injection quantity q_H is composed of base main injection quantity q_Hb and corrective main injection quantity Δq_H.

As the precontrol value for post-injection quantity q_N, a base post-injection quantity q_Nb is ascertained and set from stored characteristics maps as a function of the desired air ratio lambda of the exhaust gas (setpoint lambda). For the precise adjustment of the setpoint lambda value, the actual lambda value of the exhaust gas is measured by lambda probe 26 and compared to the setpoint lambda value in order to ascertain, as a function of the difference, a positive or negative corrective post-injection quantity Δq_N, which is added to base post-injection quantity q_Nb. Consequently, post-injection quantity q_N includes base post-injection quantity q_Nb and corrective post-injection quantity Δq_N. This yields the air ratio lambda according to equation 3.

$$\lambda = \frac{m\_L}{14.5 \cdot [(q\_Hb + \Delta q\_H) + (q\_Nb + \Delta q\_N)]} \quad (3)$$

According to example embodiments of the present invention, corrective main injection quantity Δq_H is at least partly subtracted from post-injection quantity q_N according to equation 4, portion F being a factor between zero and one ($0 \leq F \leq 1$).

$$\lambda = \frac{m\_L}{14.5 \cdot [(q\_Hb + \Delta q\_H) + (q + Nb + \Delta q\_N - F \cdot \Delta q\_H)]} \quad (4)$$

TO DETERMINE PORTION F, THE LAMBDA- AND/OR TORQUE-EFFECTIVENESS OF CORRECTIVE MAIN INJECTION QUANTITY ΔQ H DURING THE POST-INJECTION IS TAKEN INTO ACCOUNT, E.G., AS A FUNCTION OF THE INJECTION POINT. FOR THIS PURPOSE, PORTION F MAY BE METERED SO AS TO COMPENSATE AS MUCH AS POSSIBLE FOR THE INFLUENCE ON AIR RATIO LAMBDA, WHICH IS EXERTED BY CORRECTIVE MAIN INJECTION QUANTITY ΔQ H APPLIED DURING THE MAIN INJECTION. IN THIS MANNER, THE TORQUE CONTROL VIA MAIN INJECTION QUANTITY Q H AS CONTROLLED VARIABLE DOES NOT RESULT IN AN UNDESIRED INFLUENCE ON THE AIR RATIO. ON THE OTHER HAND, THE PROPORTIONAL SUBTRACTION OF CORRECTIVE MAIN INJECTION QUANTITY ΔQ H FROM POST-INJECTION QUANTITY Q N SHOULD NOT RESULT IN A SIGNIFICANT INFLUENCE ON THE TORQUE PERFORMANCE OF THE ENGINE. HOWEVER, SINCE THE SUBTRACTION OF THE POSITIVE OR NEGATIVE CORRECTIVE MAIN INJECTION QUANTITY ΔQ H FROM POST-INJECTION QUANTITY Q N ONLY RESULTS IN A SHORTENING OR EXTENSION OF THE POST-INJECTION PERIOD, THAT IS, TO AN ADVANCEMENT OR DELAY OF THE POST-INJECTION OF N E (SEE FIG. 2), AND SINCE AT THIS TIME NO TORQUE-EFFECTIVE COMBUSTION OCCURS ANY MORE DUE TO THE LACK OF OXYGEN IN THE COMBUSTION CHAMBER, THE PROPORTIONAL SUBTRACTION OF THE CORRECTIVE MAIN INJECTION QUANTITY ΔQ H FROM THE POST-INJECTION QUANTITY Q N HAS A LARGELY TORQUE-NEUTRAL EFFECT. ON THE BASIS OF THE METHOD HEREOF, IT IS THUS POSSIBLE TO EFFECT A SIMULTANEOUS AND QUICK CONTROL OF THE TORQUE AND OF THE AIR RATIO OF THE EXHAUST GAS, WITHOUT THE TWO CONTROL LOOPS INFLUENCING EACH OTHER IN A DISADVANTAGEOUS MANNER. THE INFLUENCES OF THE TORQUE CONTROL ARE THUS DECOUPLED FROM THE LAMBDA CONTROL AND VICE VERSA.

LIST OF REFERENCE CHARACTERS

| | |
|---|---|
| 10 | internal combustion engine / diesel engine |
| 12 | cylinder |
| 14 | fuel supply device |
| 16 | induction pipe |
| 18 | throttle valve |
| 20 | exhaust duct |
| 22 | primary catalytic converter/oxidation catalytic converter |
| 24 | main catalyst / $NO_x$ adsorption catalyst |
| 26 | lambda probe |
| 28 | $NO_x$ sensor |
| 30 | temperature sensor |
| 32 | temperature sensor |
| 34 | engine control unit |
| 36 | program algorithm |
| m_L | air mass |
| q | total fuel quantity |
| q_H | main injection quantity |
| q_N | post-injection quantity |
| q_Hb | base main injection quantity |
| q_Nb | base post-injection quantity |
| Δq_H | corrective main injection quantity |
| Δq_N | corrective post-injection quantity |
| H_B | start of main injection |
| H_E | end of main injection |
| N_B | start of post-injection |
| N_E | end of post-injection |
| OT | top dead center |
| UT | bottom dead center |

What is claimed is:

1. A method for controlling an air ratio lambda value and for controlling a torque of an internal combustion engine, comprising:
   supplying a fuel in at least two injection processes, including a main injection of a main injection quantity and a post-injection of a post-injection quantity;
   influencing the main injection quantity to control the torque;
   influencing the post-injection quantity to control the lambda value;
   ascertaining a corrective main injection quantity for the torque control; and
   at least proportionally subtracting the corrective main injection quantity from the post-injection quantity.

2. The method according to claim 1, wherein the internal combustion engine is arranged as a diesel engine.

3. The method according to claim 1, further comprising metering a portion of the corrective main injection quantity to compensate at least largely for an influence of the corrective main injection quantity applied in the main injection on at least one of (a) the lambda value and (b) the torque.

4. The method according to claim 1, wherein the main injection quantity includes a precontrolled base main injection quantity and the corrective main injection quantity.

5. The method according to claim 4, wherein the base main injection quantity is ascertained from a characteristics map as a function of a setpoint torque.

6. The method according to claim 4, wherein the corrective main injection quantity is determined as a function of a deviation between at least one of (a) an ascertained and (b) a measured actual torque and a setpoint torque.

7. The method according to claim 1, wherein the post-injection quantity includes a precontrolled base post-injection quantity and a corrective post-injection quantity minus the corrective main injection quantity.

8. The method according to claim 7, further comprising reading out the base post-injection quantity from a characteristics map as a function of at least one of (a) a desired exhaust gas temperature, (b) a desired catalyst temperature and (c) a setpoint lambda value of the exhaust gas.

9. The method according to claim 7, wherein the corrective post-injection quantity is determined as a function of a deviation between at least one of (a) an ascertained and (b) a measured actual lambda value and a setpoint lambda value.

10. The method according to claim 1, wherein the main injection is performed during at least one of (a) a compression stroke and (b) a power stroke.

11. The method according to claim 1, wherein the main injection is performed during at least one of (a) a compression stroke and (b) a power stroke and in a range of from approximately 15° to 5° before top dead center to 5 to 15° after top dead center.

12. The method according to claim 1, wherein the post-injection is performed during a power stroke.

13. The method according to claim 1, wherein the post-injection is performed during a power stroke in a range from 20 to 40° after top dead center.

14. A computer-readable medium having stored thereon instructions adapted to be executed by a processor, the instructions which, when executed, cause the processor to perform a method for controlling an air ratio lambda value and for controlling a torque of an internal combustion engine, comprising:

supplying a fuel in at least two injection processes, including a main injection of a main injection quantity and a post-injection of a post-injection quantity;

influencing the main injection quantity to control the torque;

influencing the post-injection quantity to control the lambda value;

ascertaining a corrective main injection quantity for the torque control; and at least proportionally subtracting the corrective main injection quantity from the post-injection quantity.

15. A method for controlling an air ratio lambda value and for controlling a torque of an internal combustion engine, in which a fuel is supplied in at least two injection processes, including a main injection of a main injection quantity and a post-injection of a post-injection quantity, and in which the main injection quantity is influenced to control the torque and the post-injection quantity is influenced to control the lambda value, comprising:

ascertaining a corrective main injection quantity for the torque control; and at least proportionally subtracting the corrective main injection quantity from the post-injection quantity.

* * * * *